A. GUISSART & E. BARBE.
BREAD TOASTER.
APPLICATION FILED JUNE 11, 1908.

996,082.

Patented June 27, 1911.
2 SHEETS—SHEET 1.

WITNESSES:

INVENTORS
Albert Guissart
Edgar Barbe,
BY
Ralph Julian Sachers
ATTORNEY

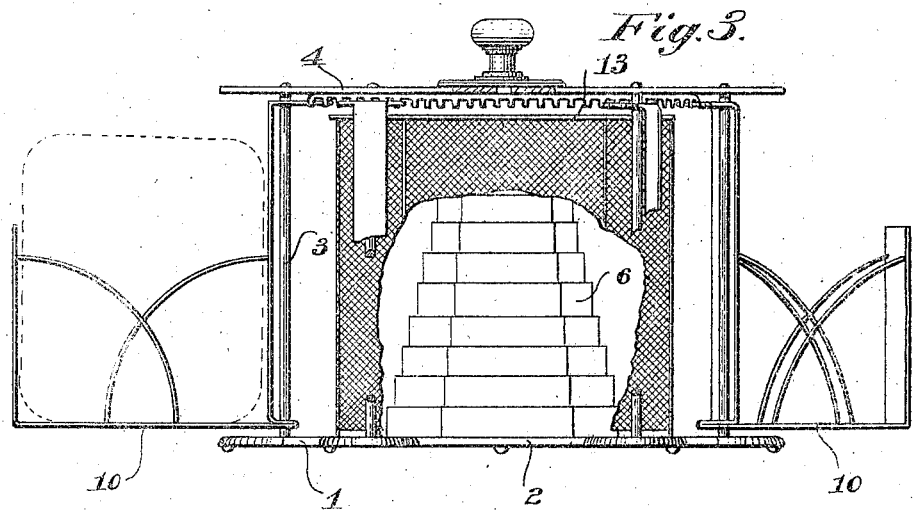

UNITED STATES PATENT OFFICE.

ALBERT GUISSART AND EDGAR BARBE, OF NEW YORK, N. Y.

BREAD-TOASTER.

996,082.  Specification of Letters Patent. Patented June 27, 1911.

Application filed June 11, 1908. Serial No. 437,870.

*To all whom it may concern:*

Be it known that we, ALBERT GUISSART, a citizen of the United States, and EDGAR BARBE, a citizen of the Kingdom of Belgium, both residents of New York, in the county of New York and State of New York, have invented certain new and useful Improvements in Bread-Toasters, of which the following is a specification.

This invention refers to a device for toasting bread or other similar material and has for its purpose to do this in a simple and efficient way, whereby both sides of the bread may be exposed to the heat radiations without removing the bread from its holder or support and, consequently, without touching it with the fingers. Bread toasters of a similar general character have been known heretofore, but it required the turning of the bread by hand or by other means, such as a fork, in order to properly toast both sides thereof. The present invention obviates this defect by the apparatus, illustrated in one preferred form in the accompanying drawings, forming part of the present application, described hereinafter and pointed out in the claims. Modifications may be made within the scope of the invention without departing from the spirit thereof.

Figure 1:
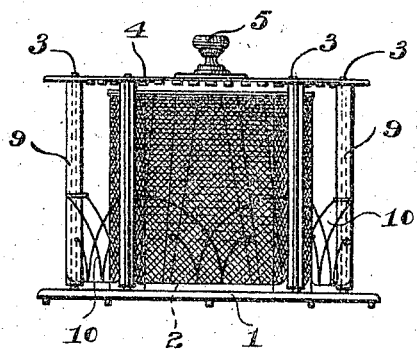
Figure 2:
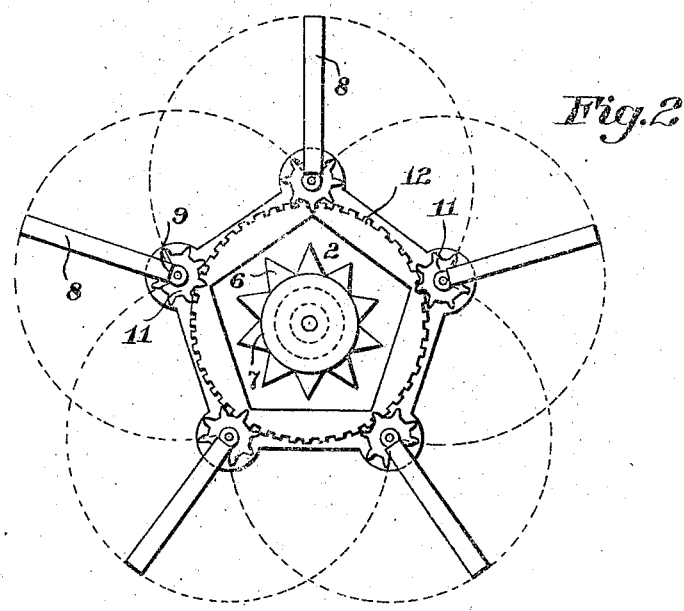

Figure 1, of the drawing, is a side elevation of the apparatus and Fig. 2, a diagrammatic bottom plan view of the same, indicating the paths of the swinging bread frames. Fig. 3 is a side elevation, showing the frames which hold the bread.

In Fig. 1, 1 is a base plate of preferably circular shape, having a pentagonal central opening which, of course, may be of any other desired polygonal or circular shape. A series of supports 3, connect the base plate 1 with a top plate 4. This top plate is solid, except a small opening in the center, into which a knob 5 enters, for a purpose hereinafter to be described. The base plate 1, further carries a series of screens 6 and 7 of any desired shape, such as a pentagonal prism, a star cross-sectional pyramid, a cone, all of which have an open bottom, their axes coinciding with the axis passing through the knob 5 of the top plate and extend to the heat deflector 13, located below the top plate 4. The outer screen is preferably located in a vertical plane. Each of the supports 3 forms a pivot for the bread frames or supports 8, comprising the rotatable carrying pieces 9 and the supporting frame 10. Integral with the carrying pieces 9, at substantially right angles thereto and located below the top plate 4 of the device are gears 11, adapted to mesh with a crown gear 12, located below and movably secured to the top plate 4, and connected to the knob 5, so that by turning the knob 5, the crown gear 12 rotates the gears 11 and swings the bread holders or frames 10 in circles, as indicated in Fig. 2.

The apparatus is used as follows:—It is placed upon the burner of a gas stove or similar heating device, then by a part rotation of the knob 5, the bread frames are brought into the position shown in Fig. 2, and suitable pieces of bread placed into the frames 10, then by turning the knob again, one side of the pieces of bread is caused to face one of the polygonal sides of the device. After this side has been sufficiently toasted, which can easily be controlled by another turn of the knob 5, the frames are swung, by again turning the knob 5, so that the untoasted side now faces the heat, until the bread is properly and thoroughly toasted. An additional feature of importance of the device consists in the fact that the bread is held in substantially a vertical position and the heat, therefore, is evenly distributed by the screens hereinbefore mentioned, so that a burning of the toast or uneven toasting is practically excluded.

What is claimed as new and useful and desired to be secured by joint Letters Patent of the United States is:—

1. The combination with a base plate and a top plate, of a plurality of standards adapted to connect the same, a hollow pyramid secured to said base plate and extending to said top plate, and adapted to radiate heat, a rotatable frame on each of said standards, and means to cause said supporting frames to face either of two abutting sides of said pyramid.

2. The combination of a toaster-body, a shaft journaled in fixed supports close to the body, a slice-holder carried by the shaft and longer than the space between the shaft and the body, so that it may hold a bread-slice with a flat side close to the body, and means for rotating the shaft to bring the opposite side of the slice close to the body.

3. The combination of a toaster-body, a plurality of shafts rotatably mounted and substantially parallel with and close to the body, a skeleton slice-holder carried by each shaft and constructed and arranged to hold a bread-slice with its flat side closely adjacent to the body, the holders being longer than the space between the shafts and the body and means provided with a single operating device for partially rotating the shafts simultaneously to present the opposite sides of the slices to the toaster body.

4. The combination of a toaster-body, a plurality of shafts pivotally mounted around the body and closely adjacent to it, a skeleton slice-holder on each shaft, the holders being much longer than the space between the shafts and the body, a rotatable member, and means intermediate the rotatable member and the shafts by which movement of the rotatable member serves to partially rotate the shafts to reverse position of the holders.

In witness whereof we have hereunto set our hands in the presence of two subscribing witnesses, at New York, in the county of New York and State of New York, this 16th day of May, 1908.

ALBERT GUISSART.
  EDGAR BARBE.

In presence of—
 JANE M. ALLAN,
 RALPH J. SACHERS.